Patented Oct. 9, 1923.

1,469,825

UNITED STATES PATENT OFFICE.

PAUL C. SEEL, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

No Drawing.        Application filed January 5, 1923.   Serial No. 610,922.

*To all whom it may concern:*

Be it known that I, PAUL C. SEEL, a citizen of the United States of America, residing at Rochester, in the county of Monroe and State of New York, have invented certain new and useful Improvements in Cellulose-Ether Compositions, of which the following is a full, clear, and exact specification.

This invention relates to cellulose ether compositions. One object of my invention is to provide a cellulose ether solution which may be manufactured into strong, flexible, transparent film on the machines and by the methods now in use. Other objects will hereinafter appear.

In U. S. Patent No. 1,188,376, Lilienfeld, June 20, 1916, there are disclosed a series of alkyl ethers of cellulose. Certain of these are practically insoluble in water and my invention relates, but is not limited, to ethers having that property. While the ethers form thin solutions in propyl, butyl and amyl acetates and in methyl alcohol, it has been found that such single solvents do not dissolve a sufficient proportion of the ethers to make desirably thick flowable compositions or dopes which are preferred in the manufacture of photographic film base by customary methods or in analogous plastic arts.

I have discovered that an adequately strong and useful solvent may be prepared by mixing either propyl, butyl or amyl acetate, or a mixture of two or more of these substances, including their isomers, with methyl alcohol. For example, I may dissolve the cellulose ether in a mixture of 25 parts of normal butyl acetate and 70 parts by weight of methyl alcohol. By means of such a mixture I can obtain a composition or dope in which there is 1 part of cellulose ether, say water-insoluble ethyl cellulose dissolved in from 4 to 6 parts of the mixed solvent. I have been unable to obtain dopes of this strength when using the acetates alone or the alcohol alone.

Other substances which impart additional suppleness or incombustibility, or other qualities, to the film may also be added to the dope, such, for instance, as triphenyl or tricresyl phosphate, camphor, etc.

The ingredients are of the ordinary commercial type and sufficiently purified for the process of film manufacture, so as to give a dope yielding films having the proper relative freedom from color. The viscous-flowable dope above described can be used in connection with the usual film-forming apparatus without the necessity of expensive alterations in the latter.

Having thus described my invention, what I claim as new and desire to secure by Letters Patent is:

1. A composition of matter comprising cellulose ether dissolved in a mixture containing an alkyl acetate and methyl alcohol, the alkyl group containing from 3 to 5 carbon atoms inclusive.

2. A composition of matter comprising an alkyl ether of cellulose dissolved in butyl acetate and methyl alcohol.

3. A flowable film-forming viscous composition of matter comprising water-insoluble ethyl cellulose dissolved in a solvent comprising 25 parts by weight of butyl acetate to 75 parts of methyl alcohol.

4. As an article of manufacture, a flexible film comprising cellulose ether and an alkyl acetate in which the alkyl group contains from 3 to 5 carbon atoms.

5. As an article of manufacture, a flexible, transparent, strong film comprising water-insoluble ethyl cellulose and butyl acetate.

Signed at Rochester, New York, this 15th day of Dec., 1922.

PAUL C. SEEL.